United States Patent

Nittel

[11] Patent Number: 6,007,884
[45] Date of Patent: Dec. 28, 1999

[54] FLEXIBLE PLASTIC CONTAINERS

[76] Inventor: Cornelius Nittel, Eintrachtstr. 13, 65193 Wiesbaden, Germany

[21] Appl. No.: 08/852,429

[22] Filed: May 7, 1997

[30] Foreign Application Priority Data

May 7, 1996 [DE] Germany ............................ 196 18 328

[51] Int. Cl.$^6$ ................................ B65D 6/00; B65D 6/40
[52] U.S. Cl. ...................... 428/35.2; 428/35.7; 220/4.13; 220/254; 220/601; 220/661; 215/44; 383/906; 222/107
[58] Field of Search ................................ 222/107; 383/53, 383/54, 906; 428/35.2, 34.7, 35.7; 220/4.13, 601, 661, 254; 215/44

[56] References Cited

U.S. PATENT DOCUMENTS

| D. 396,630 | 8/1998 | Lerner | D9/302 |
|---|---|---|---|
| 4,732,299 | 3/1988 | Hoyt | 222/94 |
| 5,147,071 | 9/1992 | Rutter et al. | 222/92 |
| 5,678,732 | 10/1997 | Gianpaolo | 222/107 |

FOREIGN PATENT DOCUMENTS

| 0 579 937 | 6/1993 | European Pat. Off. . |
|---|---|---|
| 3513388 | 4/1985 | Germany . |
| 3929664 | 9/1989 | Germany . |
| 3929665 | 9/1989 | Germany . |
| 3940497 | 12/1989 | Germany . |
| 4023274 | 7/1990 | Germany . |

*Primary Examiner*—Rena L. Dye
*Attorney, Agent, or Firm*—R. William Beard, Jr.; Frohwitter

[57] ABSTRACT

In a method for manufacturing flexible plastic containers by two die molds, in the connecting seam of which at least one insert for filling and/or emptying the container is introduced, comprising press faces running perpendicular to the wall of the container, the angle of the press faces is greater than 90°, preferable nearly 180° at each locus of connection to the die molds, with regard to the connecting seam of the two die molds.

10 Claims, 2 Drawing Sheets

FLEXIBLE PLASTIC CONTAINERS

FIELD OF THE INVENTION

The invention relates to a method for manufacturing a flexible plastic container made of two die molds, in the joining seam of which at least one insert is introduced for filling and/or emptying said container, which comprises press faces running perpendicular to the wall of the container.

BACKGROUND OF THE INVENTION

For manufacturing containers made of divided molds, various methods are known. For this purpose, for example injection molding, blow molding or swaging are applied. In many cases, the divided mold serves a better removal or taking out of the formed object so that integral containers result. For swaging of sheets by means of pressure difference, mainly divided molds for the so-called twinsheet method are known such as described in EP-0 579 937 A1. Another kind of forming out of two die molds is described in DE-35 13 388 C2. The thus formed object is compressed along a fitting face of the die molds during the forming method and is welded around its contour. Openings in the molded object have to be introduced into the wall after removal from the mold, particularly for shapes of containers for filling and emptying. Among others, a corresponding method is known from DE-40 23 274 A1.

In order to avoid this additional working step it has already been tried to weld the joining member circumferentially between the flat sheet webs such that the thermally plastified sheets enclose the outwardly projecting part of the joining member and cooling down thereon dimensionally stable (DE-39 29 665 A1 and 29 29 665 A1). Alternatively, it is also known to undercut the flange-like enlargement of an outwardly projecting tube lug. In these cases it is assumed that the forming material encloses, in a flowable state, a joining member such that a welding results, because the sheet material can cool down dimensionally stable in the vicinity of the joining member. However, practice has shown that surface areas of connecting members not heated to be flowable do not form an intimate sealing welding connection, simply by enclosing, any intimate sealing welding connection with the sheet material heated to be flowable.

For smaller containers, the content of which is maximally 20 liters, which in the documents mentioned above is derived from, the described method for connecting the container to the joining members may be sufficient in many cases. However, as far as sealing connections of molded sheets with seal members are requested, which have to withstand high test regulations to transportation safety, the known methods for containers with a content of 30 to 1000 liters and more are not suitable. The method known from DE-39 40 497 A1 is also not sufficient, because there it is assumed that flowable material is flowing into a neck when the joining member is pressed thereon with its face side. This outside connection does not enclose in a sufficiently sealing way a flange member whatsoever type it may be. It is particularly referred to the fact that an enclosure of the pipe socket in the transition range of external pipe surface up to the seam further continuing in the container edge, form a slightly open lip. This is realized because the pressure relations are not sufficient for a closed seam formation in order to form the last portion of a nearly perpendicularly running semicircle.

SUMMARY OF THE INVENTION

The invention is based upon the object to provide the transition region of the seam such that a reliable connection between the insert and the container is guaranteed.

This object is solved in that at each connection position, the press faces of the insert comprise an angle >90° to the die molds with regard to the connection seam of the two die molds. It is particularly preferable if this angle is nearly 180°. The insert which can also be referred to as flange member and which can serve the filling and/or emptying of the container is essentially designed such that a preferably cylindrical socket is arranged on a plane base member being internally open and having perpendicularly running external press faces. The socket is commonly integral with the base member and is preferably provided with a male thread for threading a cover or a supply or discharge pipe thereon.

According to a preferred embodiment, the base member of the insert can comprise press faces having a squared, rectangular or hexagonal cross section, two edges arranged opposite to each other running in the direction of the connection seam. It is particularly preferred when the insert comprises two press faces running in a curved way in plan view, which form an acute angle at two opposing ends. The press faces can, in a particularly simple embodiment, be flat. They can also comprise recesses running parallel to the connection seam. Recesses and/or bumps or elevations regularly distributed over the press face are also possible. The press faces can also be provided with a grid. The height of the press faces depends on the size of the container. It can be in the range of 20 mm and above. Preferably, the press faces are completely covered by the sheet of the container halves.

The inventive method is particularly suited for manufacturing flexible plastic containers which are inserted into foldable or collapsible pallet containers and which store or transport liquid products, with a content of more than 50 liters, preferably more than 100 liters.

BRIEF DESCRIPTION OF THE DRAWINGS

Further details and advantages of the invention can be derived from the embodiments represented in the drawing. It shows.

DETAILED DESCRIPTION OF THE INVENTION

Figure 1:
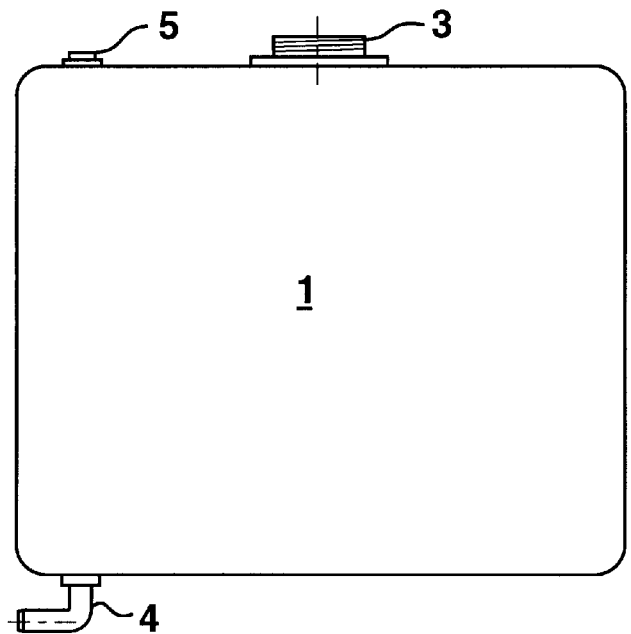
FIG. 1 a side view of a container with introduced inserts according to the invention.
Figure 2:
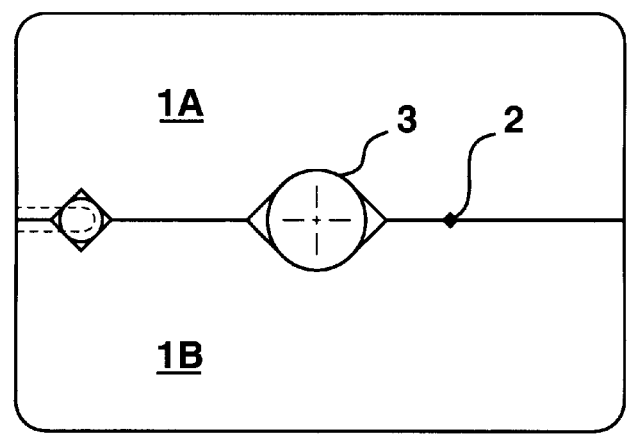
FIG. 2 a plan view of the container according to FIG. 1.
Figure 3:
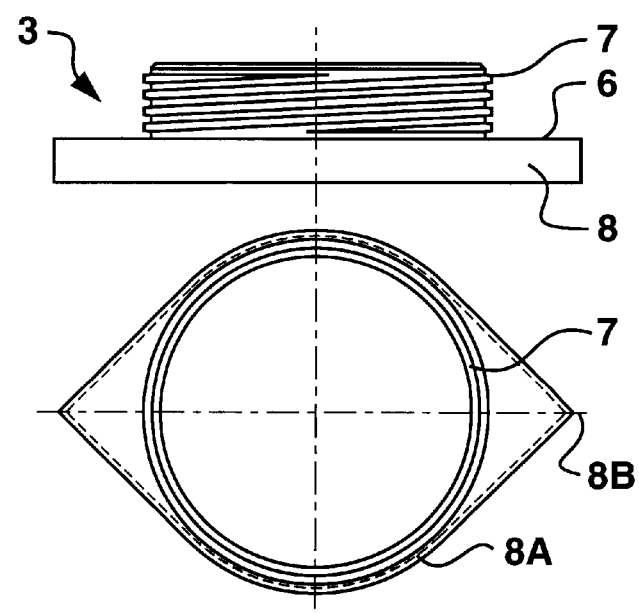
FIG. 3 a side view of the insert having a threaded lug.
Figure 4:
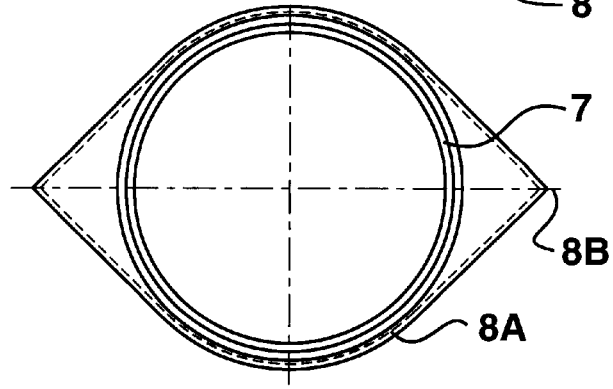
FIG. 4 a plan view on the insert represented in FIG. 3.
Figure 5:
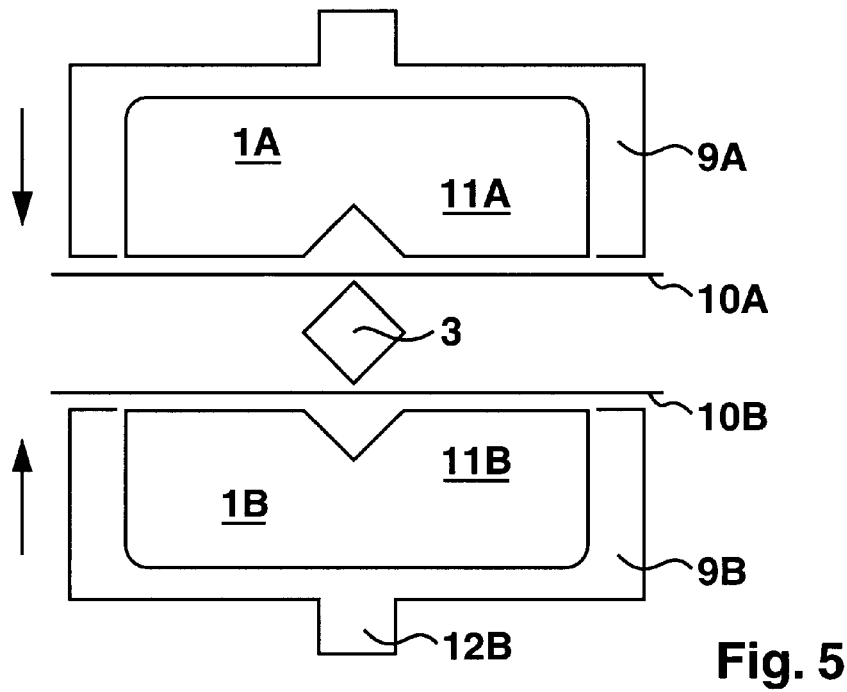
FIG. 5 a schematic section through a device for manufacturing the container halves.

The container 1 shown in FIGS. 1 and 2 is manufactured in a known way according to the so-called twinsheet method by savaging of two thermoplastic sheets by means of a pressure difference. This method is explained in greater detail later on with regard to FIG. 5. With this method, the seam position 2 of the two halves 1A and 1B of the container 1 is thermoplastically welded during the swaging process. An insert 3 is introduced into the top surface of the container 1 by means of which filling of the container 1 can be performed. This insert 3 can have various shapes as mainly described in connection with FIGS. 6A to 6F. According to the invention, it is welded-in into the seam 2. The insert 3 can be formed as fill-in socket having a thread as shown in FIGS. 3 and 4 in detail. In the bottom part of the container 1, additionally an insert 4 formed as a discharge socket can be introduced which, for example can be curved and can be provided with a stop valve. This insert 4 too, is introduced into the connection seam 2 in the inventive way and is sealingly connected to the two container halves 1A and 1B. Additionally, an insert 5 can be introduced into the top surface of the container comprising a vent opening and being provided with a thread cap. The container used for test purposes had a content of 750 liters. It had a length of 1080 mm, a width of 930 mm and a height of 765 mm. The weight of the container was 4.5 kg. The minimum wall thickness was 0.4 mm. As material, LDPE was used.

The insert 3, shown in FIGS. 3 and 4 in an enlarged scale, comprises a base member 6, the bottom surface of which is formed in a plane way and at the top surface of which a fill-in socket 7 provided with a male thread is molded, which can be closed by means of a thread cap. The base member 6 of the insert 3 comprises press faces 8 running perpendicular to the bottom surface, which, for the embodiment represented here, comprise a circle segment shaped cross section in the central area 8A corresponding to the fill-in socket 7 and which continue therefrom to run in a tangential straight way and which each form a tip 8B. The connecting line of the two tips 8B of the press faces 8 of the insert 3 coincide with the line of the connecting seam 2 of the two container halves 1A and 1B. In an embodiment of a container with the previously defined dimensions and a content of 750 liters, the height of the press faces was 20 mm and its length on the two sides of the fill-in socket each was 240 mm.

Introduction of the insert 3 is realized in the following way: According to the known twinsheet method, the two thermoplastic sheets 10A and 10B, after having heated, are drawn into the two die mold halves 9A and 9B by means of vacuum. At the position provided for receiving the press face 8 of the insert 3 of the container to be formed, a recess 11A or 11B, respectively, corresponding to the shape of the insert 3, is provided in each die mold half. The two container halves are put together in the direction of the arrows by means of take-up devices 12A and 12B in their die molds 9A and 9B, and forming the halves of the container 1A and 1B is performed, the insert 3 being held such that its press face 8 is partially covered by the edges of the two container halves 1A and 1B and subsequently is tightly connected thereto at the thermal connection of the total seam 2 of the two containers halves 1A and 1B. After driving apart the two die molds 9A and 9B, the two container halves are tightly connected to each other and to the insert 3.

Further embodiments of the base members of the insert members 3 insertable in a preferred way for the inventive method are shown in FIGS. 6A to 6F in a perspective view. These base members can be provided with filling, emptying or venting devices such as shown in FIGS. 1 and 3. At all events it is essential that, according to the invention, the edges of the press faces opposing each other coincide with a line with the connecting seam 2 or parallel thereto, respectively, of the two container halves 1A and 1B. The arcs provided with two arrow heads each show the angle between the connecting seam 2 and the press face 8.

Figure 6:
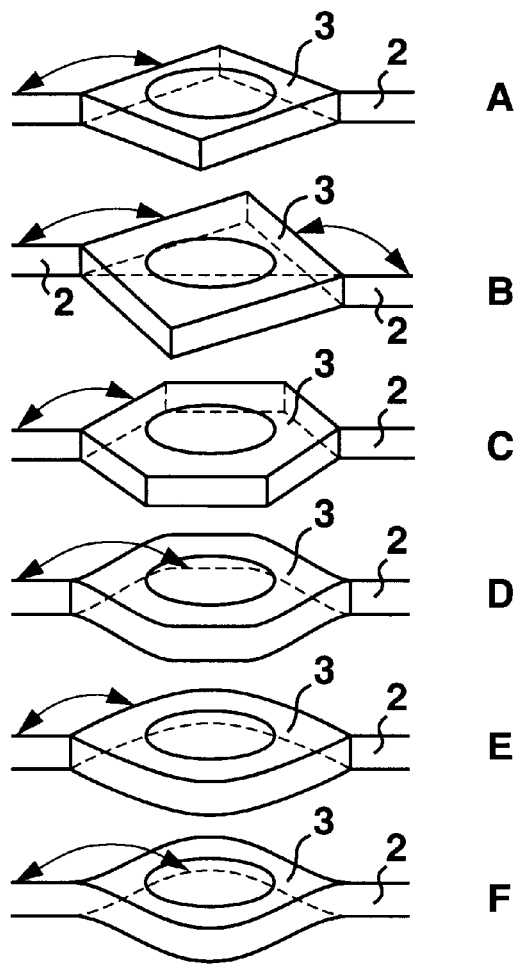
FIGS. 6A to 6F various cross sections of the insert in perspective view.

In the embodiment shown in FIG. 6A, the base member of the insert 3 is represented with a square cross section. Two edges opposing each other are arranged in the direction of the connecting seam 2 of the container halves 1A and 1B. In the embodiment 6B, the base member is formed with a rectangular cross section. From the two sides, the seam 2 terminates parallel at the edges opposing each other of the base member, however, it does not terminate in a connecting line. In the embodiment according to FIG. 6C, the base member has a regular hexagonal cross section. An embodiment derived therefrom is shown in FIG. 6D, wherein the press faces are curved in the vicinity of the edges lying in the direction of the connecting seam. FIG. 6E shows a base member, wherein the press members are entirely curved and, according to the embodiment shown in FIG. 4, comprise two edges at which the curved press faces meet each other. FIG. 6F shows an embodiment similar to the one of FIG. 6E, wherein the base member is expanded in the area of the edges.

I claim:

1. A flexible plastic container comprising:

two container halves joined at a connecting seam;

at least one insert for bi-directional fluid communication with an interior of the container, wherein the at least one insert comprises press faces which run perpendicular to an outer surface of the container, wherein angles between the connecting seam and each of the press faces are larger than 90°.

2. Container according to claim 1 wherein the angle between the press face tips and the connecting seam is nearly 180°.

3. Container according to claim 1 wherein the cross section of the insert is squared and wherein the line connecting two of the press face tips located on opposite sides of the insert is parallel to the connecting seams of the two container halves.

4. Container according to claim 1, wherein the cross section of the insert is rectangular and wherein a line connecting two of the press face tips located on opposite sides of the insert is parallel to the connecting seam.

5. Container according to claim 1, wherein the cross section of the insert is hexagonal and wherein a line connecting two of the press face tips located on opposite sides of the insert is parallel to the connecting seam.

6. Container according to claim 1 wherein the insert provides two arcuately curved press faces.

7. Container according to claim 1, wherein the press faces of the insert are planar.

8. Container according to claim 1, wherein the press faces comprise press face recesses running parallel to the connecting seam.

9. Container according to claim 1, wherein the press face surface provides regularly distributed recesses.

10. Container according claim 1, wherein a surface of at least one of the press faces comprises regularly distributed bumps.

* * * * *